Jan. 18, 1944.    G. P. BOSOMWORTH    2,339,550
METHOD OF TIRE INSPECTION
Filed April 5, 1941    2 Sheets-Sheet 2
FIG. III
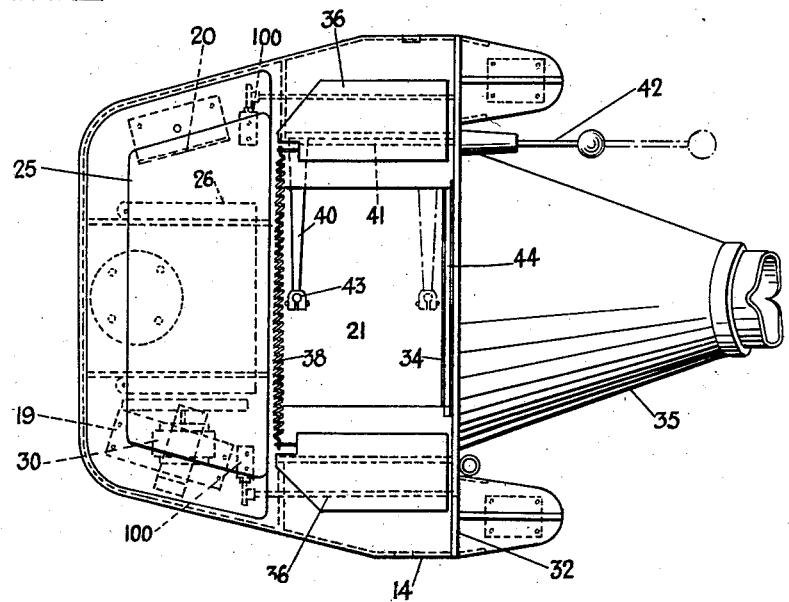
FIG. IV
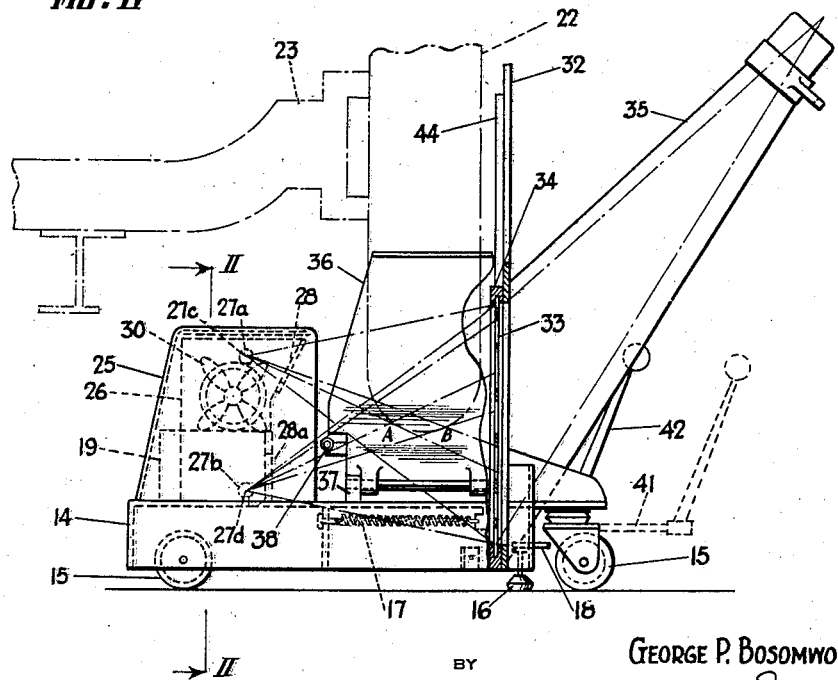
INVENTOR
GEORGE P. BOSOMWORTH
BY
ATTORNEYS Jan. 18, 1944.                G. P. BOSOMWORTH                 2,339,550
                          METHOD OF TIRE INSPECTION
                          Filed April 5, 1941          2 Sheets-Sheet 1
FIG. I
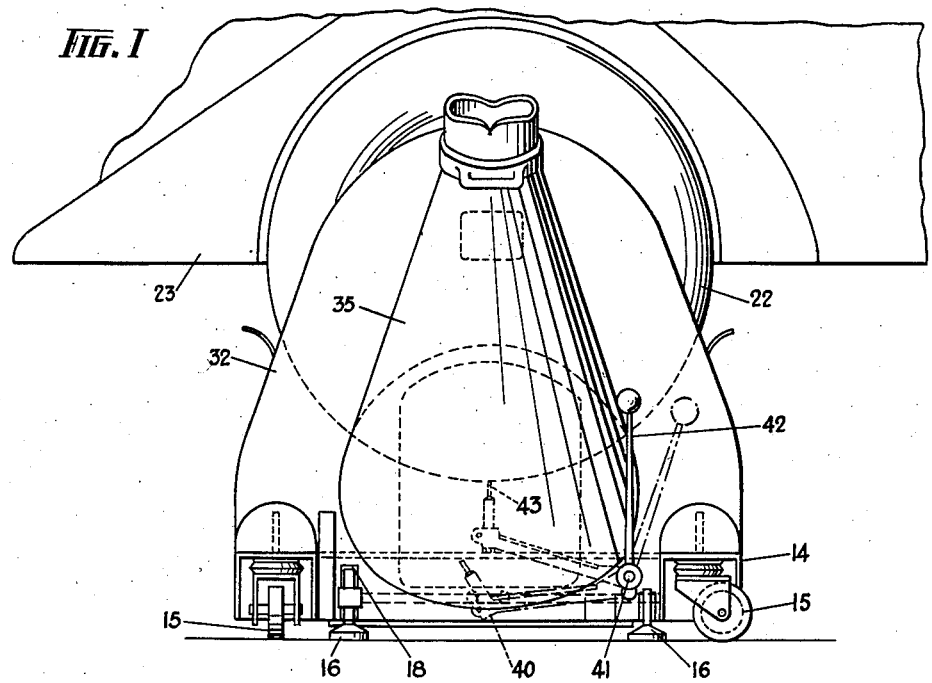
FIG. II
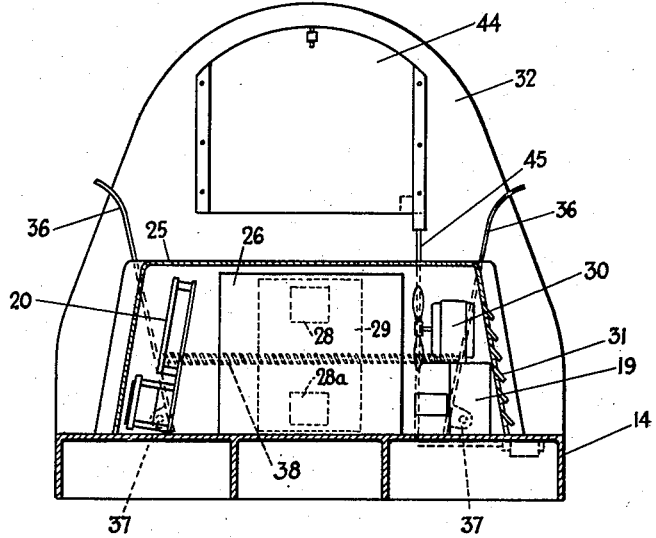
INVENTOR
GEORGE P. BOSOMWORTH
BY
ATTORNEYS Patented Jan. 18, 1944

2,339,550

UNITED STATES PATENT OFFICE 2,339,550

METHOD OF TIRE INSPECTION

George P. Bosomworth, Akron, Ohio, assignor to The Firestone Tire & Rubber Company, Akron, Ohio, a corporation of Ohio Application April 5, 1941, Serial No. 387,022

3 Claims. (Cl. 250—52)

This invention relates to a method of inspecting vehicle tires, and more especially it relates to a method of inspecting the internal structure of vehicle tires to determine the presence of foreign matter, such as tacks, nails or other metal, or stones or the like that may have penetrated the body thereof, or to discover breaks, injuries or other structural defects in the fabric carcass of pneumatic tire casings.

More particularly the invention relates to a method employing X-rays as a means for producing a visual image of the internal structure of a tire, and in some of its aspects is an improvement upon the subject matter of U. S. Patent No. 1,617,758, issued February 15, 1927, to H. C. Heynemann.

The word "tread" in the present application may be taken to mean the carcass of the tire as well as that surface of the tire normally in contact with the ground and the external portion of the tire adjacent such surface.

The chief objects of the invention are to provide a method of the character mentioned that may be utilized for inspecting vehicle tires without requiring that the latter be removed from a vehicle upon which they are being used; and which forms several images of the inspected article from different positions with relation to the inspected article. Other objects will be manifest as the specification proceeds.

Of the accompanying drawings:

Figure I is a front elevation of apparatus employed for the practice of the invention;

Figure II is a section on the line II—II of Figure IV;

Figure III is a plan view of the apparatus shown in Figure I; and

Figure IV is a side elevation thereof as viewed from the left of Figure I, a part thereof being broken away and in section.

Referring to the drawings, there is shown a mobile apparatus comprising a platform 14 that is mounted upon a plurality of swivelled wheels or casters 15, 15 so as to be capable of being moved to desired positions, said platform being provided with a central rectangular opening 21 in its surface at the front thereof, if desired. For holding the platform stationary while tire-inspections are being made, a pair of foot-like pads 16, are provided, which pads are normally held in position above the floor by a tension spring 17, Figure IV, common to the two pads. A pedal-operated cam member 18 is provided for forcing the pads 16 downwardly into, and locking the pads in engagement with the floor to hold the platform 14 stationary in desired position. The arrangement is such that the inspection apparatus readily may be wheeled into proper position with relation to a tire on a motor vehicle after the latter is elevated to the desired position by means of a jack or similar apparatus. Such a tire is shown at 22, and a fragmentary portion of the vehicle is shown at 23. The tire may be rotated by means of a suitable stick or wand of sufficient length to enable the operator to remain at a safe distance from the X-rays while turning the tire.

Mounted upon the top of platform 14, at the rear thereof, is a housing 25 within which is mounted a lead-lined box 26 containing two X-ray tubes indicated diagrammatically at 27a and 27b, of the usual oil-immersed type, the focal point of the X-ray tubes being indicated at 27c and 27d, respectively, Figure IV. The tubes 27a and 27b are shown positioned in a vertical plane with the tube 27a being adjacent the top of the box 26 while the tube 27b is adjacent the bottom of the box for a purpose hereinafter explained. There are restricted openings at 28 and 28a in the front of the box 26 and a larger opening 29, Figure IV, in the front of the housing 25, said openings enabling the X-rays from the tubes to impinge upon the tire 22. To assist in cooling the X-ray tubes, an electrically driven blower fan 30 is mounted within the housing 25 in position to direct a current of air against the box 26, the housing 25 being formed with louvers 31 to admit air thereto. Also mounted within the housing 25, beneath the fan 30, is a stabilizer 19, which if desired may be of the transformer type, said stabilizer preventing overload of the X-ray tubes. Also mounted within the housing 25, at the opposite end thereof from the stabilizer 19, is a distributor panel 20 upon which is mounted other accessories for the operation of the X-ray tubes, such as fuses, milliammeter and rheostat, and switches, such accesories being standard equipment and not requiring detail illustration or description herein. The tubes 27a and 27b may be connected to the same transformer since, in accordance with the invention, the tubes are used alternately. As is best shown in Figure IV, the focal points of the X-ray tubes are not exactly opposite the tread portion of the lowest section of the tire 22 but are somewhat above or below same, with the opening 28 in the box 26 being so arranged that most of the X-rays from tube 27a passing through the tire are downwardly inclined or tilted from said focal point, while the X-ray from the tube 27b passing through the opening 28a are upwardly inclined. The arrangement is such that the rays pass angularly through the tread portion of the tire in opposite relation to the horizontal.

On the opposite side of the tire 22 from the X-ray mechanism described is a relatively large protective apron or plate 32 of lead-coated steel, said plate being mounted upon the front margin of the platform 14. At its lower margin the plate 32 is cut away to receive a fluoroscopic screen 33 that is mounted in a suitable frame 34, said screen being so positioned as to receive the shadow or image of the tire produced by the X-rays from the X-ray tubes in box 26. Secured to the front of plate 32 is a visor 35 of conoidal shape, the large end of the visor circumscribing the screen 33, while the small end of the visor comprises a suitable aperture through which the image on the screen may be viewed. Secured to the back of plate 32 is a reservoir 44 for oil that is utilized to cool the X-ray tubes, there being a pipe line 45 from said reservoir to the X-ray mechanism.

As a further protection to the operator or others near the apparatus, a pair of pivotally mounted lead-coated plates 36, 36 are provided, which plates are disposed in the plane of the tire, between the housing 25 and the plate 32. Said plates are pivoted at their lower ends upon suitable brackets 37, 37 secured to the platform 14, and when in substantially upright position they are disposed adjacent the tire 22, fore and aft thereof. The plates 36 are connected to each other by a tension spring 38 that normally urges them toward each other when said spring is over center with relation to the pivot points of the plates in brackets 37, the movement of the plates toward each other being arrested by engagement of the plate-margins with the top of platform 14, at the pivoted end of the plates, as is best shown in Figure II. The pivotal mounting of the plates 36 enables them to be tilted downwardly so as to facilitate the positioning of the apparatus in operative relation to a tire on a vehicle, and when in downwardly tilted position the plates serve to open respective cam-operated cut-out switches 100, 100 arranged in series in the electrical circuit of the X-ray mechanism, the arrangement being such as to prevent energising the X-ray tubes, except when the plates 36 are in elevated position.

The apparatus is provided with a manually operated marking device by which the location of hidden defects, as revealed by the X-rays, may be indicated on the tire. Said marking device comprises an arm 40 that is disposed below the opening 21 in the platform, and is supported at one end upon a suitably journaled, axially and angularly movable rod 41, the latter being disposed below the surface of the platform at one side of opening 21 and provided at its forward end with an operating lever 42 by which it may be moved axially or rocked angularly. The arm 40 extends laterally from the rod 41, its free end being disposed substantially in the same vertical plane as the axis of the tire 22, and provided with a suitable marking substance 43 such as chalk or crayon. The arm 40 should be visible in the screen 33 in order to facilitate locating its end in the portion of the tire to be marked. In Figure I the arm 40 is shown in two alternative angular positions, and in Figure III, is shown in two alternative lateral positions.

In the operation of the apparatus described, a vehicle having thereon pneumatic tires to be inspected is elevated at one end by means of a jack or the like, and the inspection apparatus is moved under one of the tires thereof to a position where the lowest part of the tire is directly between the X-ray tubes and the screen 33. The protective plates 36, which have been lowered during the foregoing operation are then turned upward to the position shown in Figure I. One of the X-ray tubes is then energised from any suitable source of electricity (not shown) in the usual manner, the X-ray emanations passing through the body of the tire obliquely and projecting the shadow or image thereof on the fluoroscopic screen 33. Thus an inspector gazing into the visor 35 at the small end thereof readily can detect the presence of any foreign substances within the structure of the tire. The tire 22 is caused to rotate slowly by an assistant who uses a non-metallic rod for the purpose and stands at a position out of range of the X-ray emanations. When a defect in the tire is discovered, the inspector marks the location thereof by means of the crayon 43 which he manipulates by means of the lever 42. Then the inspecting operation is repeated with the second X-ray tube being energised. Or, the different tubes may be used alternately on one region of the tire before rotating the tire. Or, the separate tubes may be used in different zones of the tire until a suspicious image appears which, of course, should be checked by use of the second X-ray tube.

Suitable control means (not shown) of standard construction are provided for the tubes 27a and 27b so that they can be selectively and only individually energised. The positioning of the tubes and comparison of the separate images obtained therefrom enables the operator to establish the definite location of any foreign material or break in the tire. Figure IV indicates how the rays from the tube 27b pass substantially perpendicularly through the tread zone which the rays from the tube 27a pass through at substantially zero angle thereto. That is, the X-rays from tube 27a pass through a relatively longer, or thicker section of the region of the tire tread indicated at A than they pass through in the region of the tread indicated at B, while the X-rays from the tube 27b pass through a relatively long or thick portion of the region B and a short portion of the region A. Relatively "dead" spots or poor images of the tire are formed on the screen 33 by the X-rays passing through the longer, or thicker sections of the tire tread. Hence alternate use of the tubes 27a and 27b enables a good composite image of the entire tread to be obtained since the image formed by the rays from one X-ray tube clearly shows that region of the tread shown most poorly in the image of the tread formed by the other X-ray tube.

Ordinarily a single tire inspection can be made in from 1½ to 3 minutes, depending on how much of the tire requires double checking its image. Neither X-ray tube should be energised for periods of longer than two minutes, and should be allowed to cool for at least two minutes before again being energised. The two minute cooling interval necessarily occurs in checking the tire with the second tube, or it may be advantageously utilized in some cases by moving the apparatus into operative position with relation to another tire on the vehicle.

The apparatus is so constructed as not to require a tire to be removed from a vehicle in order that an X-ray inspection may be made, thereby conserving time and labor. The apparatus is mobile so as to be available for use at any place where electric power is available, it can be completely operated by one man, it is adequately shielded to provide protection to the operator, and it enables the operator to determine the exact location of any foreign particles, etc. in the tire. The method is easily practiced and obviously may be practiced with other apparatus than that illustrated herein.

Other modification may be resorted to without departing from the spirit of the invention or the scope thereof as defined by the appended claims.

What is claimed is:

1. A method of inspecting vehicle tires for defects and imbedded articles therein without removing the tires from the vehicle, said method comprising positioning the tire being inspected to permit free rotation thereof, positioning a pair of spaced X-ray tubes on one side of the tire for the direction of X-rays through the tire, positioning a fluorescent body on the opposite side of the tire in the direct path of X-rays which pass through the tire, and exciting first one and then the other of said X-ray tubes while the tire is positioned with the area to be inspected intermediate the X-ray tubes and the fluorescent body, whereby an operator may have two separate views of said tire area each taken at different angles in respect thereto.

2. A method of inspecting tires for defects and imbedded articles therein, said method comprising positioning the tire being inspected to permit free rotation thereof, positioning a pair of spaced X-ray tubes on one side of the tire for the direction of X-rays through the tire, positioning a fluorescent body on the opposite side of the tire in the direct path of X-rays which pass through the tire, and exciting first one and then the other of said X-ray tubes while the tire is positioned with the area to be inspected intermediate the X-ray tubes and the fluorescent body, whereby an operator may have two separate views of said tire area each taken at different angles in respect thereto.

3. That method of inspecting the tread portion of a pneumatic tire and locating the position of any foreign particle or break therein comprising the steps of positioning one section of the tread in a predetermined position, a substantially vertical fluorescent screen being positioned adjacent that section of the tread, passing X-rays through the section of the tread at an acute angle to its horizontal, rotating the tire to expose different sections of the tread to inspection upon the fluorescent screen, passing X-rays through the tread at an opposite acute angle to the horizontal, rotating the tire to form a second image of the tread thereof and positively determine the condition of the tire tread, and marking the location of any foreign particle or break in the tire, said marking being done during the period of exposure of said particle or break on said fluorescent screen.

GEORGE P. BOSOMWORTH.